United States Patent
Fasolino et al.

(10) Patent No.: US 9,876,983 B2
(45) Date of Patent: Jan. 23, 2018

(54) SYSTEM AND METHOD FOR PROVIDING POWER FROM A STANDARDIZED COMPONENT WITHOUT A POWER SOURCE OUTPUT TO AN ACCESSORY COMPONENT

(71) Applicant: Raytheon Company, Waltham, MA (US)

(72) Inventors: Stephen T. Fasolino, McKinney, TX (US); Jason L. Wheeler, Murphy, TX (US); Brian J. Mercer, Plano, TX (US)

(73) Assignee: Raytheon Company, Waltham, MA (US)

( * ) Notice: Subject to any disclaimer, the term of this patent is extended or adjusted under 35 U.S.C. 154(b) by 67 days.

(21) Appl. No.: 14/726,134

(22) Filed: May 29, 2015

(65) Prior Publication Data

US 2016/0353051 A1  Dec. 1, 2016

(51) Int. Cl.
*H04N 5/63* (2006.01)
*G06F 1/26* (2006.01)
*H02J 1/00* (2006.01)
*H04B 5/00* (2006.01)
*F41G 1/32* (2006.01)
*F41G 3/16* (2006.01)

(52) U.S. Cl.
CPC ............... *H04N 5/63* (2013.01); *G06F 1/26* (2013.01); *H02J 1/00* (2013.01); *H04B 5/0031* (2013.01); *H04B 5/0037* (2013.01); *F41G 1/32* (2013.01); *F41G 3/165* (2013.01)

(58) Field of Classification Search
CPC ... H04N 5/63; F41G 1/32; F41G 3/165; H02J 1/00; H04B 5/0031; H04B 5/0037; G06F 1/26

USPC .................................................. 345/204–214
See application file for complete search history.

(56) References Cited

U.S. PATENT DOCUMENTS

| | | | | |
|---|---|---|---|---|
| 5,517,015 A * | 5/1996 | Curry | ..................... | G01K 1/028 |
| | | | | 235/492 |
| 6,330,977 B1 * | 12/2001 | Hass | ..................... | G06F 3/0383 |
| | | | | 235/487 |
| 7,782,240 B2 * | 8/2010 | Ng | ..................... | H04L 12/40032 |
| | | | | 341/155 |
| 9,378,723 B2 * | 6/2016 | Bernal Castillo | .... | G10K 11/178 |
| 2002/0109481 A1 | 8/2002 | Waterman et al. | | |
| 2004/0159776 A1 * | 8/2004 | Richard | ................. | H03K 19/14 |
| | | | | 250/214 R |

(Continued)

OTHER PUBLICATIONS

Maxim, Maxim-DS28EC20-20Kb1-Wire EEPROM, Rev 4, Mar. 2012, http://www.maximintegrated.com/datasheet/index.mvp/id/5453 viewed on Dec. 13, 2013, 27 pages.*

(Continued)

*Primary Examiner* — Dmitriy Bolotin

(57) ABSTRACT

An accessory component for a standardized component without a power source output is provided. The standardized component includes a communication device. The accessory component includes a data input port and a power input port. The data input port is configured to receive a data signal from the standardized component. The power input port is configured to receive a transmit signal from the communication device. The accessory component is configured to process the data signal using power provided by the transmit signal.

20 Claims, 3 Drawing Sheets

(56) References Cited

U.S. PATENT DOCUMENTS

| | | | |
|---|---|---|---|
| 2006/0133798 A1* | 6/2006 | Palmer | G02B 23/12 396/427 |
| 2006/0281435 A1* | 12/2006 | Shearer | G06K 19/0707 455/343.1 |
| 2009/0091634 A1* | 4/2009 | Kennedy | G02B 23/12 348/217.1 |
| 2010/0245066 A1* | 9/2010 | Sarioglu | G01S 7/003 340/436 |
| 2013/0322010 A1* | 12/2013 | Hung | G06F 13/4081 361/679.41 |
| 2015/0055789 A1* | 2/2015 | Bernal Castillo | G10K 11/178 381/71.6 |
| 2015/0071480 A1* | 3/2015 | Jones | H02J 7/0044 381/384 |

OTHER PUBLICATIONS

Maxim, Maxim Single-Channel 1-Wire Master with Sleep Mode, Rev 4, Jan. 2012, http://www.mouser.com/ds/2/256/DS2482-101-81852.pdf viewed on Dec. 13, 2013, 24 pages.*

"1μA Supply Current, 1Mbps, 3.0V to 5.5V, RS-232 Transceivers with AutoShutdown Plus", Maxim Integrated Products, Inc. catalog, 2008, pp. 1-20, 19-1289, Rev. 4, Sunnyvale, CA.

"DX-17 1700 MHz World's smallest Video Transmitter", Technical Specifications, rf-links.com; Copyright 2001-2007; 1 page.

"DX-5 World's Smallest Video Transmitter 1900 MHz", Technical Specifications, rf-links.com; Copyright 2001-2010; 1 page.

Notification of Transmittal of the International Search Report and the Written Opinion of the International Searching Authority, or the Declaration dated Jun. 17, 2016 in connection with International Patent Application No. PCT/US2016/024630.

Maxim: "Maxim>Design Support>Technical Documents>Tutorials>1-Wire Devices>APP 1796 Maxim>Design Support>Technical Documents>Tutorials>iButton>APP 1796 Overview of 1-Wire Technology and Its Use", Jun. 19, 2008, 13 pages.

Thurein Paing et al., "Resistor Emulation Approach to Low-Power RF Energy Harvesting", IEEE Transactions on Power Electronics, vol. 23, No. 3, May 2008, p. 1494-1501.

\* cited by examiner

SYSTEM AND METHOD FOR PROVIDING POWER FROM A STANDARDIZED COMPONENT WITHOUT A POWER SOURCE OUTPUT TO AN ACCESSORY COMPONENT

TECHNICAL FIELD

The present disclosure is directed, in general, to thermal weapon sights and, more specifically, to a system and method for providing power from a standardized component without a power source output, such as a thermal weapon sight, to an accessory component, such as a video transmitter.

BACKGROUND

Limitations inherently exist when designing an accessory component to be incorporated into a standardized component. For example, if a standardized component does not include a power output, any accessory component designed for that standardized component generally requires its own power source. For a particular example, traditional weapon sights and enhanced night-vision goggles are designed based on a standardized model provided by the U.S. government that does not include a power output. As a result, accessories such as video transmitters are typically hard-wired into an external power source. However, hard-wiring a video transmitter for a weapon sight or night-vision goggles into a power source introduces the risk of snags and breakage, while also limiting distance and flexibility of movement.

SUMMARY

This disclosure provides a system and method for providing power from a standardized component without a power source output to an accessory component.

In one embodiment, an accessory component for a standardized component without a power source output is provided. The standardized component includes a communication device. The accessory component includes a data input port and a power input port. The data input port is configured to receive a data signal from the standardized component. The power input port is configured to receive a transmit signal from the communication device. The accessory component is configured to process the data signal using power provided by the transmit signal.

In another embodiment, a data transmitter includes a data input port, a power input port and a low-power data transmitter. The data input port is configured to receive a data signal from a standardized component without a power source output. The standardized component includes a communication device. The power input port is configured to receive a transmit signal from the communication device. The low-power data transmitter is configured to transmit the data signal using power provided by the transmit signal.

In yet another embodiment, a method for providing power from a standardized component without a power source output to an accessory component is provided. The standardized component includes a communication device. The method includes receiving a transmit signal from the communication device at the accessory component. The accessory component is powered with the transmit signal.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

Figure 1:
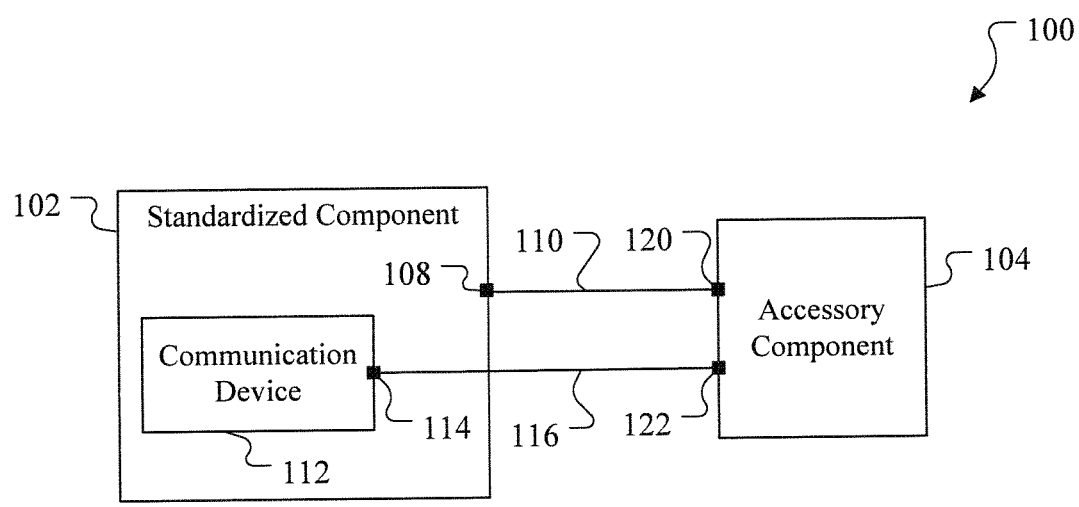
FIG. 1 illustrates a system for providing power from a standardized component without a power source output to an accessory component in accordance with an embodiment of the present disclosure.
Figure 2:
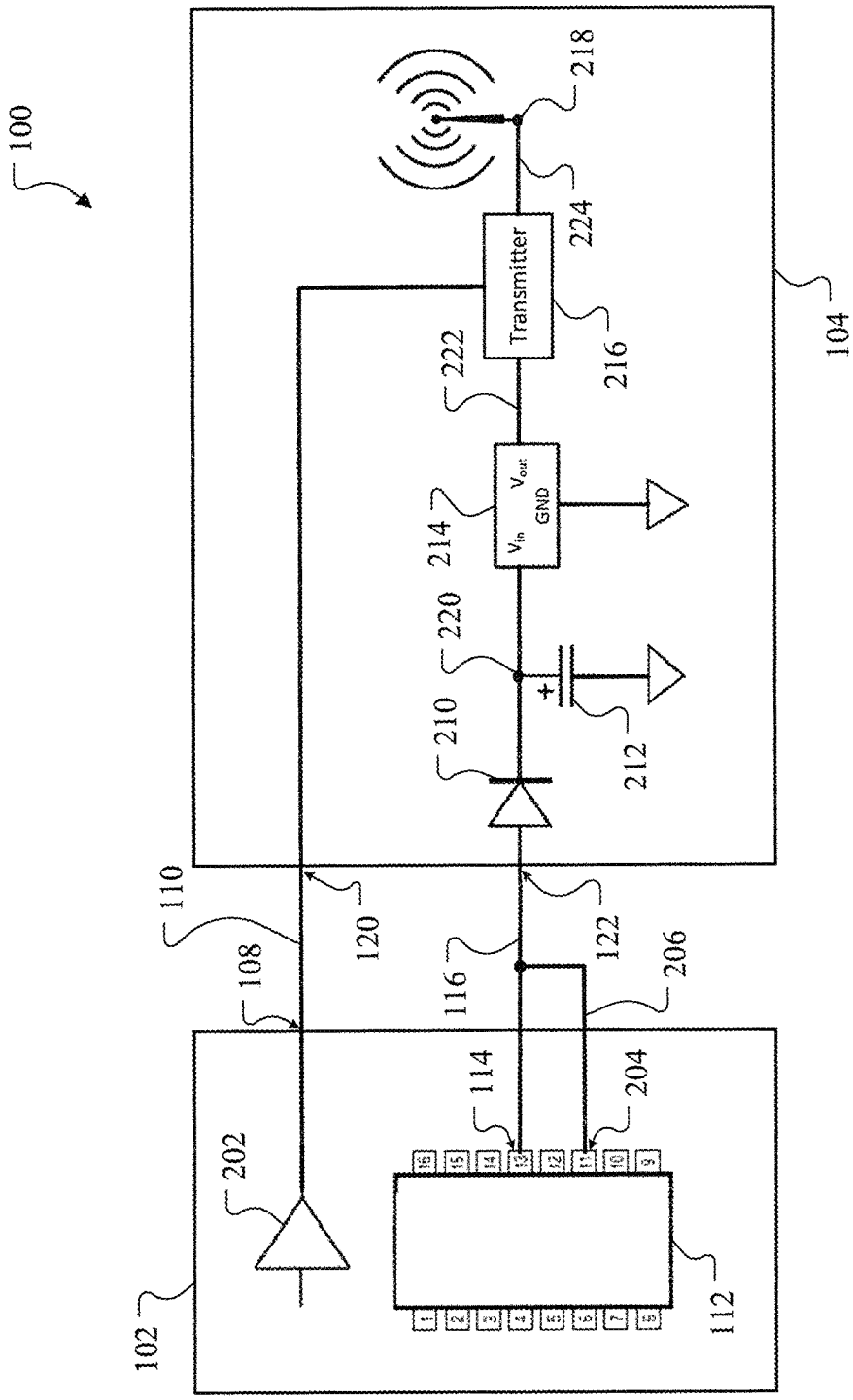
FIG. 2 illustrates the system of FIG. 1 in accordance with a particular embodiment of the present disclosure.
Figure 3:
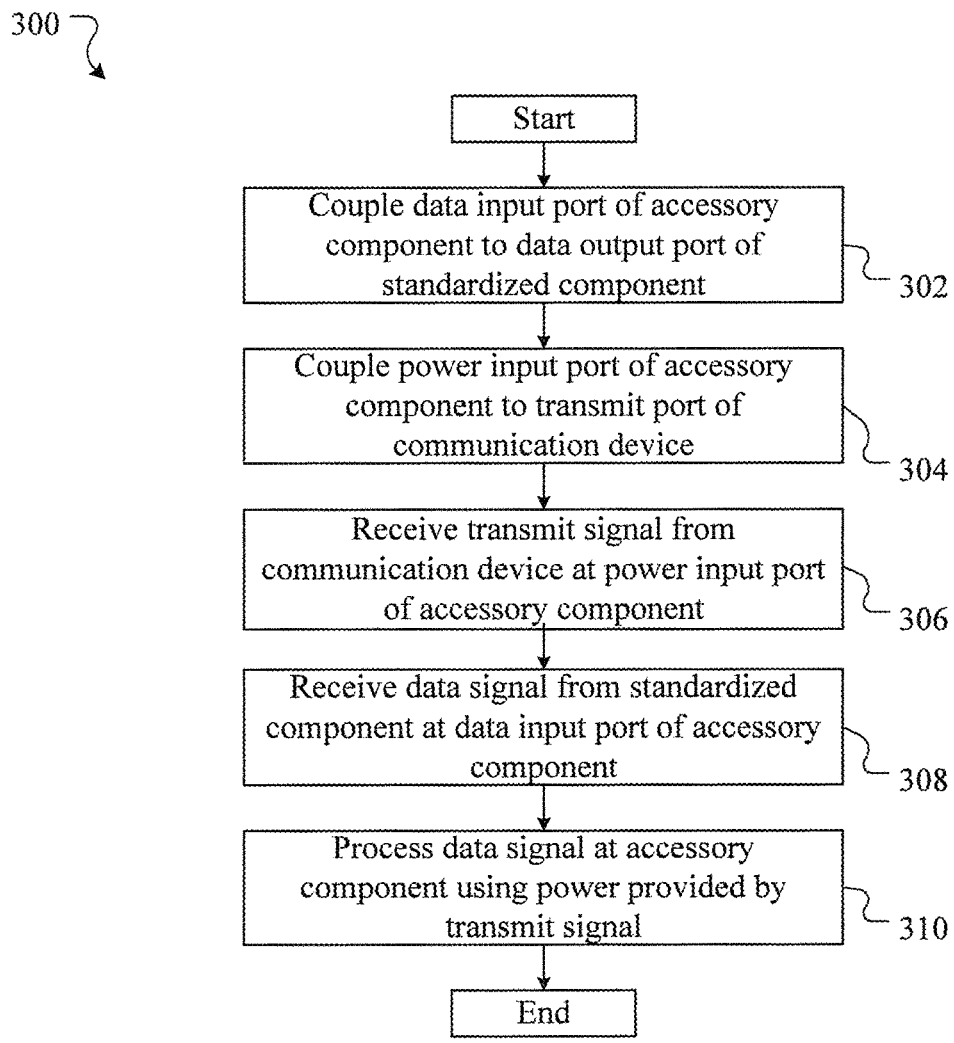
FIG. 3 is a flowchart illustrating a method for providing power from a standardized component without a power source output to an accessory component in accordance with an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

FIG. 1 illustrates a system 100 for providing power from a standardized component 102 without a power source output to an accessory component 104 in accordance with an embodiment of the present disclosure. The embodiment of the system 100 shown in FIG. 1 is for illustration only. Other embodiments of the system 100 could be used without departing from the scope of this disclosure.

For the illustrated embodiment, the system 100 includes a standardized component 102 and an accessory component 104 designed to support the standardized component 102. The standardized component 102 includes a data output port 108 that is configured to provide an output data signal 110 from the standardized component 102. The data signal 110 may include video data, audio data and/or any other type of data.

The standardized component 102 also includes a communication device 112 that is configured to transmit and receive data for the standardized component 102. For example, the communication device 112 may be configured to be used in testing or controlling the standardized component 102 by receiving data and acting on or transmitting processed data. Thus, the communication device 112 includes a transmit port 114 that is configured to provide a transmit signal 116 from the communication device 112. The standardized component 102 includes no dedicated external output power pins.

The accessory component 104 includes a data input port 120 that is configured to receive the data signal 110 from the data output port 108 of the standardized component 102. The accessory component 104 also includes a power input port 122 that is configured to receive the transmit signal 116 from the communication device 112 of the standardized component 102. As described in more detail below, the accessory component 104 includes a low-power device that is configured to process the data signal 110 while being powered by the transmit signal 116. Thus, the accessory component 104 may be configured to transmit, analyze, store and/or otherwise process the data in the data signal 110. The transmit signal 116 may include a high (or 1) digital signal that sources sufficient current to power the accessory component 104. Therefore, as used herein, the term "low-power" refers to a power level associated with a high transmit signal 116. For some embodiments, the transmit signal 116 may be shared to allow shared communications and/or power. For these embodiments, the system 100 may include a capacitor, rechargeable battery, or the like.

Thus, using the system 100, the accessory component 104 may be incorporated into existing hardware of the standardized component 102 without the need for a hard-wired power source. As a result, the accessory component 104 is plug-and-play, allowing integration of the accessory component 104 into the standardized component 102 without the need for any hardware or software modifications to the standardized component 102.

Although FIG. 1 illustrates one example of a system 100 for providing power from a standardized component 102 without a power source output to an accessory component 104, various changes may be made to the embodiment shown in FIG. 1. For example, the makeup and arrangement of the system 100 are for illustration only. Components could be added, omitted, combined, subdivided, or placed in any other suitable configuration according to particular needs.

FIG. 2 illustrates the system 100 in accordance with a particular embodiment of the present disclosure. The embodiment of the system 100 shown in FIG. 2 is for illustration only. Other embodiments of the system 100 could be used without departing from the scope of this disclosure.

For the illustrated embodiment, the system 100 includes a standardized component in the form of a thermal weapon sight 102 and an accessory component in the form of a sight-powered video transmitter 104. The thermal weapon sight 102, which includes no external output power pins, includes a video output device 202 that is configured to provide video data as the output data signal 110 via the data output port 108. The communication device 112 in this example is represented by a MAX3226E device on an RS-232 integrated circuit. However, it will be understood that the communication device 112 may include any other suitable type of communication device.

The illustrated communication device 112 includes the transmit port 114 at pin 13, which is configured to provide the transmit signal 116, and a receive port 204 at pin 11, which is configured to receive a receive signal 206. For this example, the communication device 112 may be configured to allow the thermal weapon sight 102 to be tested or configured to another system. Thus, a testing device or other system (not shown in FIG. 2) may be temporarily coupled to the thermal weapon sight 102 via the communication device 112. However, while the thermal weapon sight 102 is operating, the communication device 112 may be configured to remain dormant such that the transmit port 114 and the receive port 204 are available for use by the accessory component 104.

For the example illustrated in FIG. 2, the power input port 122 of the video transmitter 104 is coupled to the transmit port 114 and to the receive port 204 of the communication device 112. Thus, when the video transmitter 104 is coupled to the thermal weapon sight 102, activity on the receive signal 206 will cause the transmit signal 116 to become high (or 1). The communication device 112 is configured to react to transitions in the receive signal 206 in order to keep the device 112 from entering "auto-shutdown" when not being used for traditional communication. Thus, based on receive signal 206 activity, the communication device 112 may be configured to generate a high transmit signal 116. This results in an auto-shutdown mechanism on the RS-232 chip being defeated, allowing an internal charge-pump circuit in the communication device 112 to be leveraged to provide a source of power through the transmit signal 116. In this way, the communication device 112 may be manipulated into providing the transmit signal 116 for use in powering active circuitry in the video transmitter 104. However, it will be understood that the communication device 112 may be manipulated into providing a high transmit signal 116 in any other suitable manner without departing from the scope of this disclosure.

For the illustrated embodiment, the video transmitter 104 includes a diode 210, a filter capacitor 212, a linear voltage regulator 214, a low-power video transmitter 216 and an antenna 218. The diode 210 is configured to receive the transmit signal 116 from the communication device 112 and, together with the filter capacitor 212, is configured to generate a filtered signal 220 based on the transmit signal 116. The linear voltage regulator 214 is configured to regulate the voltage of the filtered signal 220 to generate a regulated voltage 222. The low-power video transmitter 216 is configured to be powered by the current associated with the regulated voltage 222.

The low-power video transmitter 216 is also configured to receive the data signal 110, which includes video data from the video output device 202 of the thermal weapon sight 102, via the data input port 120 and to transmit the video data 224 from the antenna 218 to a commander display, a helmet-mount display, enhanced night-vision goggles and/or any other suitable receiving device. In this way, video data from the thermal weapon sight 102 may be wirelessly transmitted to any suitable location for processing without the video transmitter 104 requiring a wired, external power source or a transmission cable.

Thus, using the system 100 of FIG. 2, for example, a spotter may see and evaluate what a sniper is seeing through the sniper's thermal weapon sight 102. As another example, a soldier may have enhanced situational awareness, such as by being provided with rapid target acquisition, being able to see around corners, or otherwise receiving additional situational awareness while remaining out of harm's way. In addition, pseudo family of weapon sight (FWS) capabilities may be incorporated into existing hardware, and video or other data may be fed from the thermal weapon sight 102 to enhanced night-vision goggles or any other suitable head-mounted displays (or from one set of enhanced night-vision goggles coupled to a video transmitter 104 to another set of enhanced night-vision goggles). Finally, the video transmitter 104 is plug-and-play, allowing full integration with currently fielded units without the need for any hardware or software modifications to those units.

Although FIG. 2 illustrates one example of a system 100 for providing power from a standardized component 102 without a power source output to an accessory component 104, various changes may be made to the embodiment shown in FIG. 2. For example, the makeup and arrangement of the system 100 are for illustration only. Components could be added, omitted, combined, subdivided, or placed in any other suitable configuration according to particular needs.

FIG. 3 is a flowchart illustrating a method 300 for providing power from a standardized component 102 without a power source output to an accessory component 104 in accordance with an embodiment of the present disclosure. The method 300 shown in FIG. 3 is for illustration only. Power may be provided from a standardized component 102 without a power source output to an accessory component 104 in any other suitable manner without departing from the scope of this disclosure.

A data input port 120 of the accessory component 104 is coupled to a data output port 108 of the standardized component 102 (step 302). A power input port 122 of the accessory component 104 is coupled to a transmit port 114 of a communication device 112 in the standardized component 102 (step 304). The accessory component 104 receives a transmit signal 116 from the communication device 112 at the power input port 122 (step 306). As a particular example, in some embodiments, the power input port 122 may also be coupled to a receive port 204 of the communication device 112 in order to provide activity on the receive signal 206 and, thus, cause the transmit signal 116 generated at the transmit port 114 to be high. The accessory component 104 also receives a data signal 110 from the standardized component 102 at the data input port 120 (step 308). The accessory component 104 processes the data signal 110 using power provided by the transmit signal 116 (step 310). For example, in some embodiments, the accessory component 104 may include a low-power video transmitter 216 and the data signal 110 may include video data. For these embodiments, the low-power video transmitter 216 may wirelessly transmit video data 224 while being powered by the current provided by the transmit signal 116.

Although FIG. 3 illustrates one example of a method 300 for providing power from a standardized component 102 without a power source output to an accessory component 104, various changes may be made to the embodiment shown in FIG. 3. For example, while shown as a series of steps, various steps in FIG. 3 could overlap, occur in parallel, occur in a different order, or occur multiple times.

Modifications, additions, or omissions may be made to the apparatuses and methods described here without departing from the scope of the disclosure. For example, the components of the apparatuses may be integrated or separated. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An accessory component for a standardized component without a power source output, wherein the standardized component comprises a communication device, the accessory component comprising:
   a data input port configured to receive a data signal from the standardized component; and
   a power input port configured to (i) provide activity on a receive signal that is received by the communication device and (ii) after providing the activity on the receive signal, receive a transmit signal transmitted from the communication device in response to the activity on the receive signal, wherein the accessory component is configured to process the data signal using power provided by the transmit signal.

2. The accessory component of claim 1, wherein the communication device comprises a transmit port configured to provide the transmit signal and a receive port configured to receive the receive signal, and wherein the power input port is coupled to the transmit port and to the receive port.

3. The accessory component of claim 1, further comprising a low-power video transmitter and an antenna, wherein the data signal comprises video data, and wherein the low-power video transmitter is configured to process the data signal by wirelessly transmitting the video data via the antenna.

4. A data transmitter comprising:
   a data input port configured to receive a data signal from a standardized component without a power source output, the standardized component comprising a communication device;
   a power input port configured to (i) provide activity on a receive signal that is received by the communication device and (ii) after providing the activity on the receive signal, receive a transmit signal transmitted from the communication device in response to the activity on the receive signal; and
   a low-power data transmitter configured to transmit the data signal using power provided by the transmit signal.

5. The data transmitter of claim 4, further comprising:
   a diode coupled to the power input port; and
   a filter capacitor coupled to the diode, wherein the diode and the filter capacitor are configured to generate a filtered signal based on the transmit signal.

6. The data transmitter of claim 5, further comprising a linear voltage regulator configured to generate a regulated voltage based on the filtered signal, wherein the low-power data transmitter is configured to transmit the data signal using power associated with the regulated voltage.

7. The data transmitter of claim 4, wherein the data signal comprises one of video data and audio data.

8. The data transmitter of claim 4, further comprising an antenna, wherein the low-power data transmitter is configured to transmit the data signal by wirelessly transmitting the data signal via the antenna.

9. The data transmitter of claim 4, wherein the communication device comprises a transmit port configured to provide the transmit signal and a receive port configured to receive the receive signal, and wherein the power input port is coupled to the transmit port and to the receive port.

10. The data transmitter of claim 4, wherein the standardized component comprises a thermal weapon sight.

11. The data transmitter of claim 10, wherein the communication device comprises an integrated circuit chip having an auto-shutdown feature that is defeated by the data transmitter so that an internal circuit of the integrated circuit chip provides the transmit signal to the data transmitter.

12. The data transmitter of claim 4, wherein the standardized component comprises enhanced night-vision goggles.

13. A method for providing power from a standardized component without a power source output to an accessory component, wherein the standardized component comprises a communication device, the method comprising:
providing activity on a receive signal that is received by the communication device;
receiving, at the accessory component, a transmit signal transmitted from the communication device in response to the activity on the receive signal; and
powering the accessory component with the transmit signal.

14. The method of claim 13, further comprising coupling a power input port of the accessory component to a transmit port of the communication device, wherein the transmit signal is received from the transmit port at the power input port.

15. The method of claim 14, further comprising coupling the power input port to a receive port of the communication device.

16. The method of claim 13, further comprising coupling a data input port of the accessory component to a data output port of the standardized component to defeat auto-shutdown of the communication device.

17. The method of claim 16, further comprising:
receiving a data signal from the data output port at the data input port; and
processing the data signal at the accessory component using power provided by the transmit signal.

18. The method of claim 13, wherein the standardized component comprises a thermal weapon sight.

19. The method of claim 18, wherein the communication device comprises an integrated circuit chip having an auto-shutdown feature that is defeated by the accessory component so that an internal circuit of the integrated circuit chip provides the transmit signal to the accessory component.

20. The method of claim 13, wherein the standardized component comprises enhanced night-vision goggles.

* * * * *